(12) United States Patent
Hashimoto

(10) Patent No.: US 8,521,010 B2
(45) Date of Patent: Aug. 27, 2013

(54) CONTENT PLAYBACK UNIT AND ELECTRONIC DEVICE

(75) Inventor: Hiroyuki Hashimoto, Suwa-gun (JP)

(73) Assignee: Seiko Epson Corporation, Tokyo (JP)

( * ) Notice: Subject to any disclaimer, the term of this patent is extended or adjusted under 35 U.S.C. 154(b) by 1751 days.

(21) Appl. No.: 11/357,058

(22) Filed: Feb. 21, 2006

(65) Prior Publication Data

US 2006/0215998 A1     Sep. 28, 2006

(30) Foreign Application Priority Data

Mar. 23, 2005   (JP) ................. 2005-083448

(51) Int. Cl.
*H04N 5/93* (2006.01)
*H04N 5/76* (2006.01)

(52) U.S. Cl.
USPC .......................... 386/353; 386/291

(58) Field of Classification Search
USPC ...................... 386/46, 95
See application file for complete search history.

(56) References Cited

U.S. PATENT DOCUMENTS

| | | | |
|---|---|---|---|
| 5,913,039 A * | 6/1999 | Nakamura et al. | 709/231 |
| 5,956,037 A * | 9/1999 | Osawa et al. | 345/418 |
| 6,424,793 B1 | 7/2002 | Setogawa et al. | |
| 6,470,140 B1 | 10/2002 | Sugimoto et al. | |
| 6,526,222 B2 | 2/2003 | Sugimoto et al. | |
| 2001/0038743 A1 * | 11/2001 | Murata | 386/82 |
| 2004/0100487 A1 * | 5/2004 | Mori et al. | 345/724 |
| 2004/0234236 A1 * | 11/2004 | Torobu | 386/46 |
| 2004/0240853 A1 * | 12/2004 | Tsurusaki et al. | 386/95 |

FOREIGN PATENT DOCUMENTS

| | | |
|---|---|---|
| JP | A-11-164258 | 6/1999 |
| JP | A-2001-111944 | 4/2001 |
| JP | A 2001-326867 | 11/2001 |

* cited by examiner

*Primary Examiner* — William C Vaughn, Jr.
*Assistant Examiner* — Asher Khan
(74) *Attorney, Agent, or Firm* — Oliff & Berridge, PLC

(57) ABSTRACT

A content playback unit includes a content management mechanism that plays back a plurality of contents in a predetermined order to display their images on an image display device. The content management mechanism manages the contents by adding numerical information indicative of scheduled playback time to the contents.

12 Claims, 9 Drawing Sheets

FIG. 5A
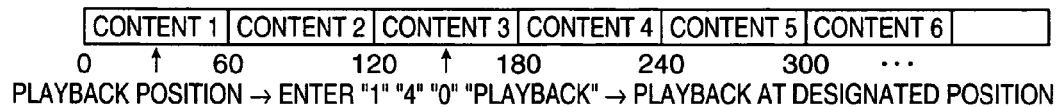
PLAYBACK POSITION → ENTER "1" "4" "0" "PLAYBACK" → PLAYBACK AT DESIGNATED POSITION
FIG. 5B
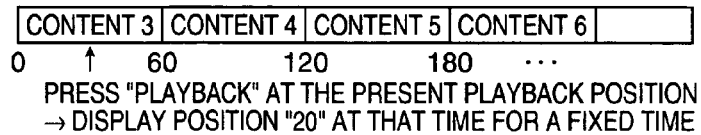
PRESS "PLAYBACK" AT THE PRESENT PLAYBACK POSITION
→ DISPLAY POSITION "20" AT THAT TIME FOR A FIXED TIME
FIG. 5C
* TV POWER OFF → TV POWER ON *
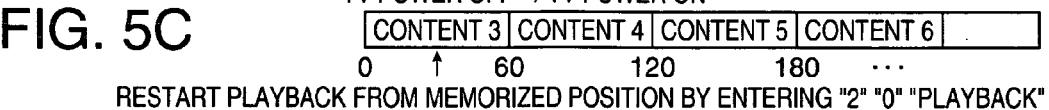
RESTART PLAYBACK FROM MEMORIZED POSITION BY ENTERING "2" "0" "PLAYBACK"
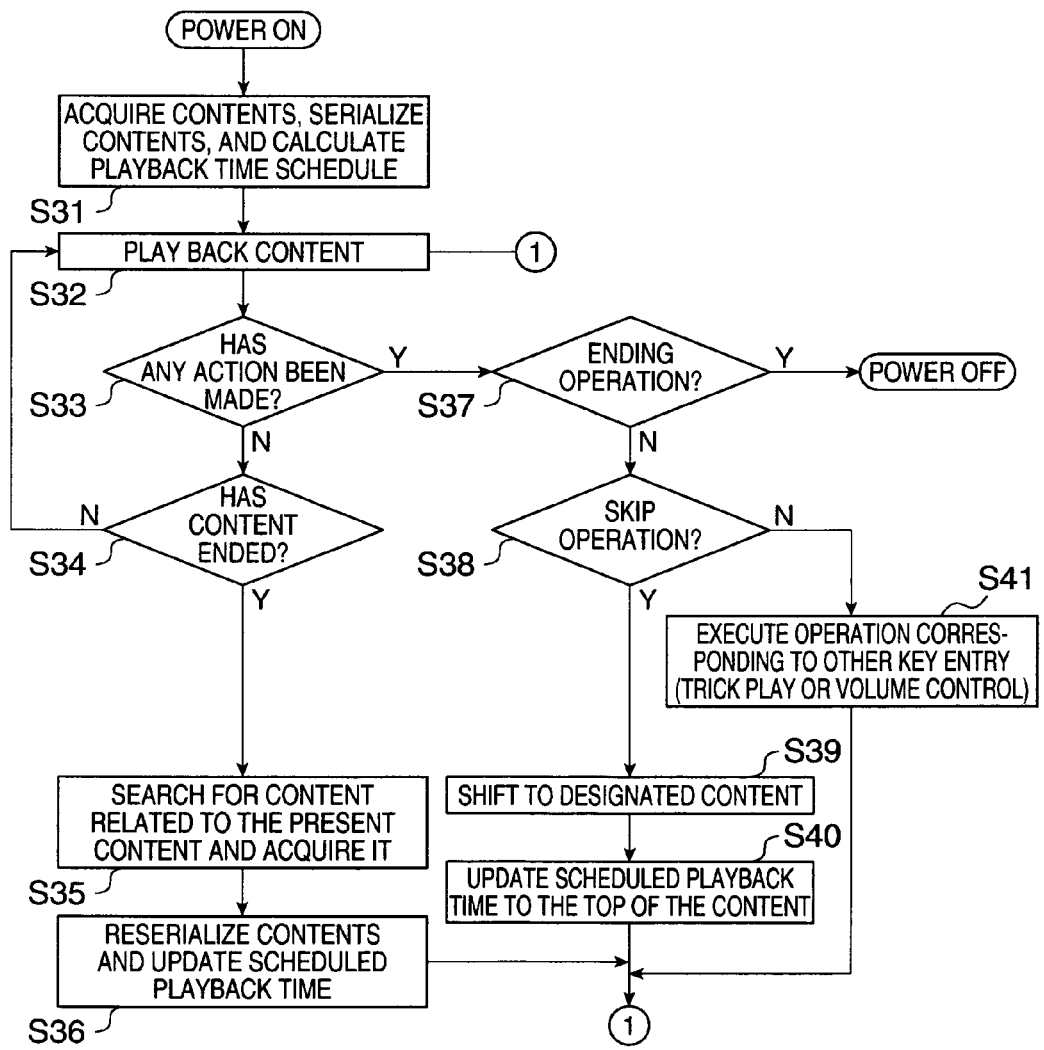
FIG. 6

FIG. 9A
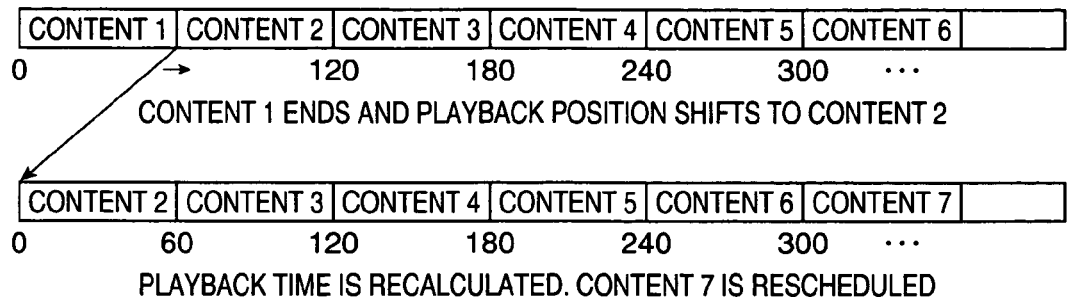
FIG. 9B
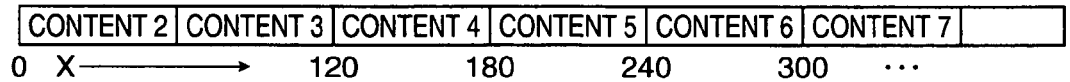
FIG. 9C
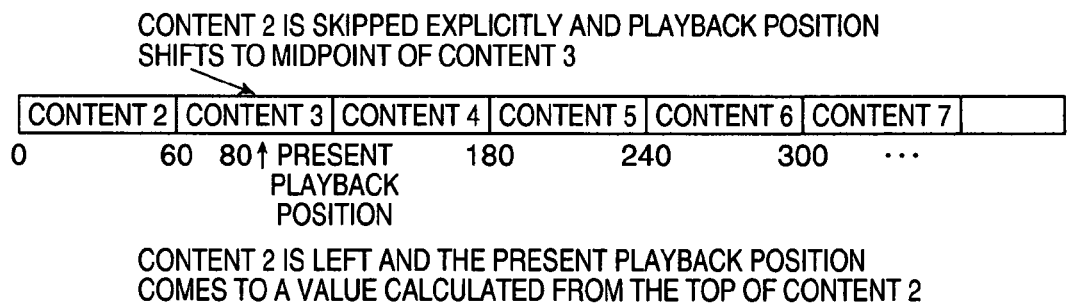
FIG. 9D

CONTENT PLAYBACK UNIT AND ELECTRONIC DEVICE

BACKGROUND

1. Technical Field

The present invention relates to a content playback unit capable of playing back contents on a server or of the unit itself and an electronic device incorporating the same, and in particular, it relates to dynamic alternation of a content playback schedule that is once drawn up.

2. Related Art

TV set are known in recent yeas which can play back multimedia contents using a video-on-demand (VOD) system via a network and a file system Here the contents include still images, moving images, and audio. Those TV sets generally manage the contents independently with tags such as file names, universally unique identifiers (UUIDs), and universal resource identifiers (URIs) that are unique IDs on a server or a file system.

However, although the tags indicative of contents are managed so as to be unique to each content, they have high redundancy because they have a large number of digits from the nature thereof and generally managed as character strings containing alphanumeric characters, and the correlation between the tags and the contents is not assured. Accordingly, in most of the TV sets, a list of titles indicative of the contents is displayed on the screens of the TV sets as the tags themselves or aliases, on which serial numbers or focuses are given for the purpose of convenience, thereby allowing selection of contents by numeral entry or a cursor key.

However, there is no relationship between the contents and the numerals on the menu, and the contents listed are treated in parallel. Accordingly, in order to view the displayed contents continuously, it is necessary to repeat the operations of displaying a content selection menu displaying a list of the contents every playback, selecting a content, and playing back the content. This results in low operability. For contents having no title information, the actual contents cannot be known even by a character-string menu-selection system, so that there is no reference for menu selection, which requires complicated key entry operation of repetition of selection, confirming contents by test playback, pause, and reselection, and repetitive transition between the menu and playback.

Well known examples for improvement include a system in which complicated contents are hierarchically organized in a folder, and the organized contents of the folder are treated collectively, and a system in which classified virtual "channels" are produced (e.g., JP-A-2001-326867).

However, the system of virtual "channels" has the problems that folder names and channels are needed by the classified numbers, that the way of classification and the relationship with the folder names or channel names must always be under consideration, and that it becomes more difficult to dynamically reorganize desired contents.

SUMMARY

An advantage of some aspects of the invention is to provide a content playback unit capable of reorganizing desired contents dynamically without folders or channels, and an electronic device incorporating the same.

A content playback unit according to a first aspect of the invention includes a content management mechanism that plays back a plurality of contents in a predetermined order to display their images on an image display device. The content management mechanism manages the contents by adding numerical information indicative of scheduled playback time to the contents. In this case, the content playback unit manages the contents using scheduled playback time. Accordingly, the multiple contents are not treated individually and treated as a series of contents according to the schedule without being classified into multiple groups of contents such as folders or channels. Also the order of the playback of the contents and so on can be controlled by numerical key entry corresponding to the scheduled playback time or various control keys. Furthermore, there is no need to use operation buttons such as an arrow key necessary for selecting channels, folders, and contents on a list, thus simplifying the structure and operation of the remote controller.

In the content playback unit, it is preferable that the content management mechanism manage the contents by adding numerical information indicative of scheduled playback time to contents following the top of a content that is being played back at the present. In this case, the content management mechanism manages the scheduled playback time for a content following a content that is being played back at the present. Thus the playback order and so on can be controlled only by numerical key entry corresponding to the scheduled playback time and with various control keys. Furthermore, the content playback time can be designated directly, reducing the time and labor for finding the beginning of a content after playback operation, as in the related-art systems, to allow smooth playback operation for any contents.

It is preferable that the content playback unit further includes a controller for inputting various control signals. Preferably, when numerical information for managing contents and a control signal for a specified control key are input from the controller, the content management mechanism plays back the content from a portion indicated by the numerical information. In this case, when numerical information on scheduled playback time and a control signal for a specified control key (e.g., a playback key) are input, playback from a scheduled playback time specified by the numerical information can be made.

In the content playback unit, preferably, when a control signal for a specified control key is input while a content is displayed on the image display device, the content management mechanism display the playback time of the content on the image display device. In this case, the playback time of the content is displayed on the display screen through operation of a specified control key (e.g., a playback key). Accordingly, the user can view the content again from the playback time, which is stored in some form, by inputting numerical information on the playback time and a control signal for a specified control key (e.g., a playback key).

In the content playback unit, preferably, when a control signal for skipping or fast-forwarding is input, the content management mechanism start playback from the relevant content or a designated position of the content. In this case, when a control key is operated and so the control signal is input, playback from a desired position can be made easily.

In the content playback, preferably, when the playback of the content ends, the content management mechanism deletes the completed content from the management, and adds a new content. In this case, since completed contents are deleted from the management and a new content is added, contents can be effectively managed in a limited time base.

In the content playback unit, it is preferable that the content management mechanism stores information on multiple contents that are scheduled to be played back before power-off and playback position in a nonvolatile memory at power-off, and starts playback on the basis of the information at the next power-on. In this case, information at power-off is stored, and playback is started on the basis of the information at the next power-on. Thus the relevant content can be played back uninterruptedly.

A content playback unit according to a second aspect of the invention includes a content management mechanism that plays back a content to display its image on an image display device. When the playback of the content is completed, the content management mechanism searches for a content related to the content from a file system or an external server, and plays back the content. In this case, a content related to the played content is captured and played back, allowing dynamic reorganization of content scheduling using information related to the content. Thus, the content can always be played back in the optimum order, allowing playback of the optimum content interruptedly without the need for scheduling.

A content playback unit according to a third aspect of the invention includes a content management mechanism that plays back a content to display its image on an image display device. When a control signal for a specified control key (e.g., a BGM key) is input during the playback of a moving-image content, the content management mechanism searches for music related to the moving-image content from a file system or an external server, and plays back the music. In this case, a moving-image content and music related thereto can be played back in an appropriate combination.

In the content playback unit, preferably, when the playback of the music has not yet ended even when the playback of the moving-image content ends, the content management mechanism searches for an image related to the music from the file system or the external server, and plays back the image. In this case, music and an image related thereto can be played back in an appropriate combination.

An electronic device according to a fourth aspect of the invention includes the above-described content playback unit.

It is preferable that the electronic device further include an image display device that displays an image played back by the content playback unit.

BRIEF DESCRIPTION OF THE DRAWINGS

The invention will be described with reference to the accompanying drawings, wherein like numbers reference like elements.

FIG. 5 is a diagram showing the transition of contents and playback positions.

FIG. 6 is a flowchart for an operation according to a third embodiment of the invention.

FIG. 9 is an explanatory diagram showing the transition of contents and playback positions.

DESCRIPTION OF EXEMPLARY EMBODIMENTS

First Embodiment

Figure 1:
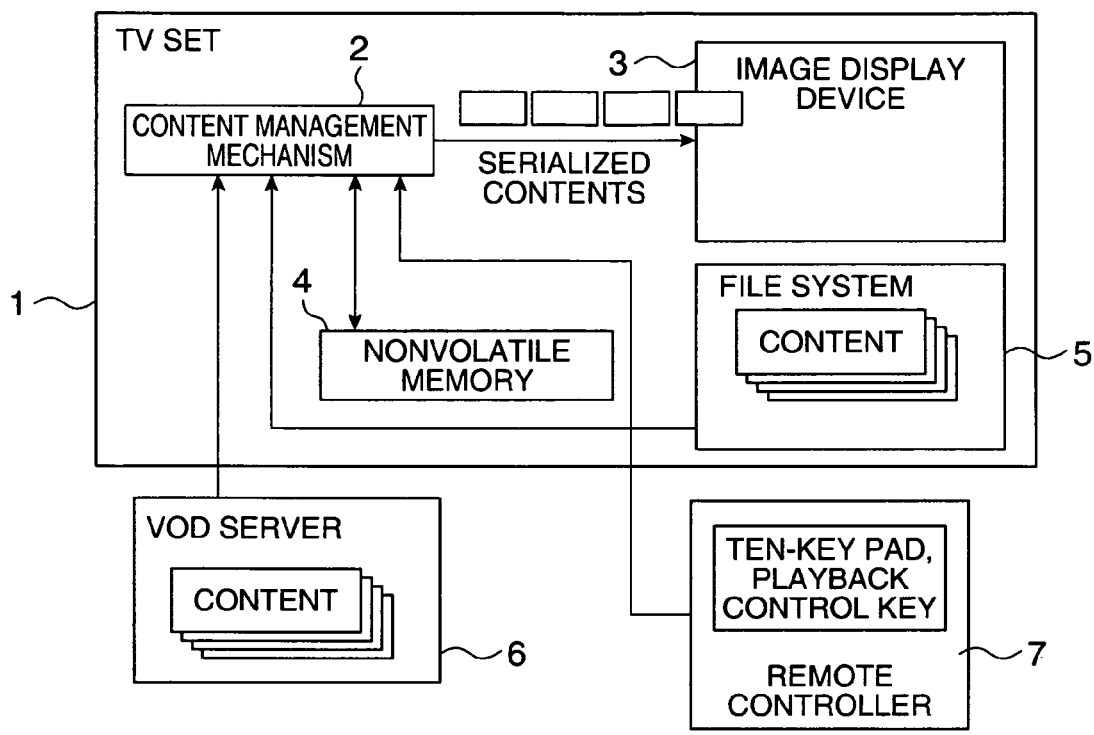
FIG. 1 is a schematic block diagram of a TV receiver according to a first embodiment of the invention.

FIG. 1 is a schematic block diagram of a TV receiver (hereinafter, referred to as a TV set) 1 according to a first embodiment of the invention. FIG. 1 shows only components necessary for describing the first embodiment, in which components that have no direct bearing on the description are omitted. The TV set 1 includes a content management mechanism 2, an image display device 3, a nonvolatile memory 4, and a file system 5. The content management mechanism 2 manages video-on-demand (VOD) contents; specifically, the content management mechanism 2 acquires information on multiple-contents playback time from the built-in file system 5 or a VOD server 6, internally temporarily determines (serializes) the order of playback of the contents, and stores scheduled content-playback time. In addition to those, the content management mechanism 2 dynamically alters the order of the contents serialized in response to a control signal from a remote controller 7. The nonvolatile memory 4 stores the scheduled playback time, as will be described later, and necessary information even while the power of the TV set 1 fails. The remote controller 7 includes various playback control keys including an exit key, a playback key, a skip key, a fast-forward key, a BGM key, a stop key, and a pause key, in addition to a power button and a 0-9 numeric keypad.

Figure 2:
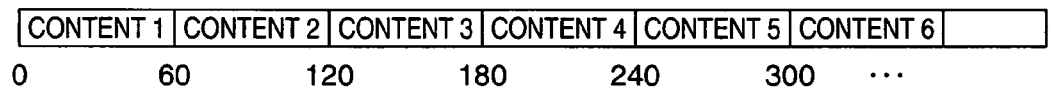
FIG. 2 is a diagram showing an example of serialized contents.

FIG. 2 shows an example of contents serialized by the content management mechanism 2, in which numerals indicative of scheduled content playback times at the present time are added as information. For examples when six contents of a sixty-minute program each are scheduled to be played back in series as an example of time unit in minutes, numeral "0" indicates the scheduled time that the first content (content 1) is played back; "60" is for the second content (content 2); and "120" is for the third content (content 3). Although the time unit in the following embodiments is assumed to be a minute, it may not necessarily be a minute but may be a second or thirty minutes. Accordingly, the information to be added may not necessarily be a time stamp indicative of scheduled playback time, and the unit may be changed as necessary.

The algorithm for the content management mechanism 2 to initially and temporarily determine the order of playback of multiple contents may be any means, such as at random, in order of precedence, or alphabetically. The contents to be played back may be scheduled only from the file system 5 or only from the VOD server 6, or from both the file system 5 and the VOD server 6. The scheduled content playback time may not necessarily be contiguous; for example, it may be repeated from nine in the morning to seven in the evening, or may be at any intervals.

Figure 3:
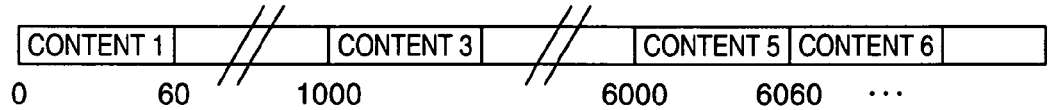
FIG. 3 is a diagram showing other serialized contents.

FIG. 3 shows other contents serialized by the content management mechanism 2, in which contents to be played back are arranged discontinuously. For example, numeral "0" indicates the scheduled time that the first content (content 1) is played back; "1000" is for the second content (content 2); and "6000" is for the fifth content (content 5), in which the contents are played back discontinuously.

In the first embodiment, contents are managed in association with scheduled playback time, as described above. The multiple contents are therefore played back in series according to a schedule without being treated individually or being classified into multiple content groups of folders or channels. Also, the content playback operation can be controlled explicitly only by numeric ten-key entry corresponding to the scheduled playback time and several kinds of playback control keys. Thus there is no need to use operation buttons such as an arrow key necessary for selecting channels, folders, and contents on a list, simplifying the structure and operation of the remote controller.

The invention will be described for examples in which the content management mechanism 2 dynamically rearranges contents, and plays back them according to a control signal from the remote controller 7 with reference to second to fifth embodiments.

Second Embodiment

Figure 4:
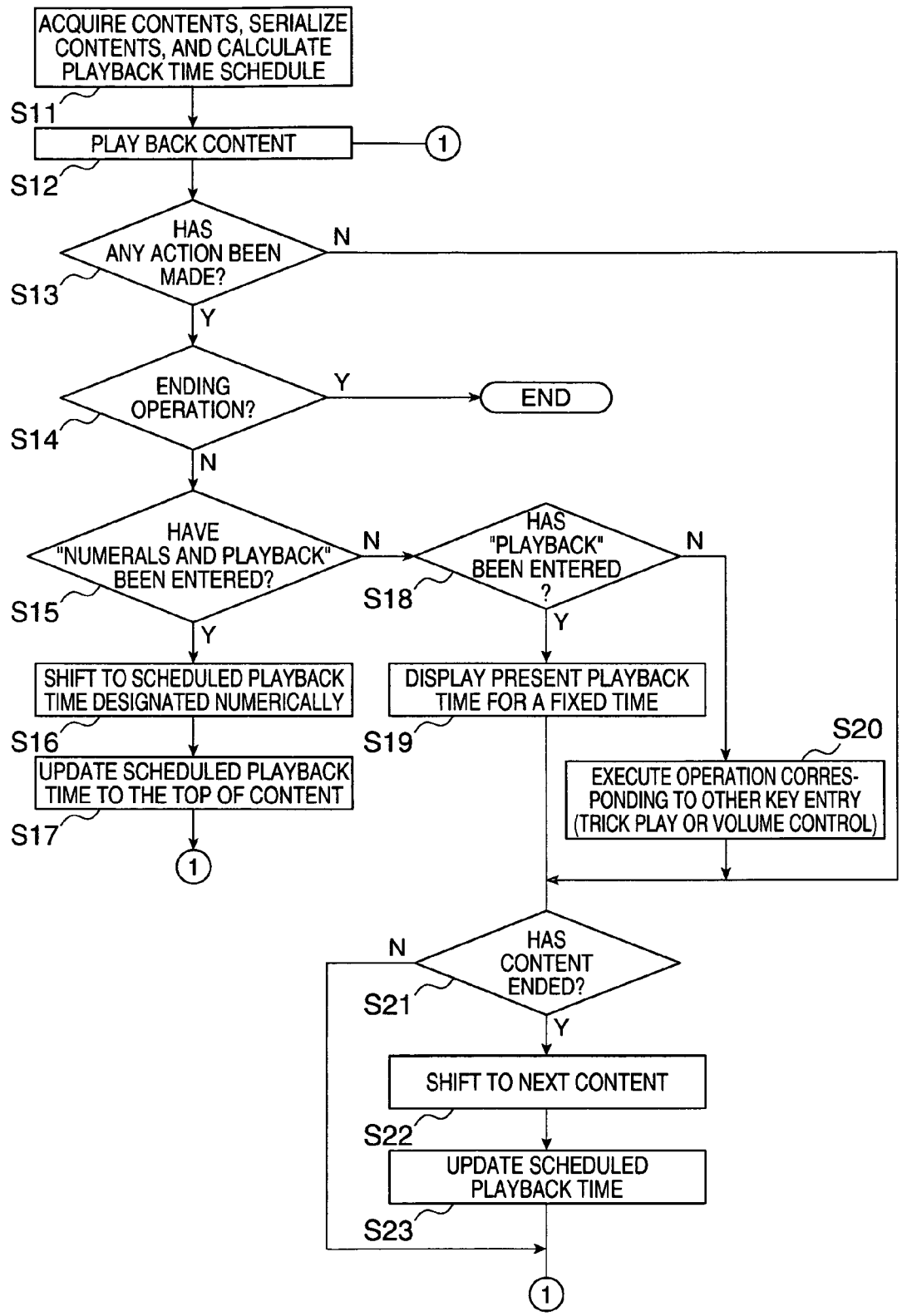
FIG. 4 is a flowchart for an operation according to a second embodiment of the invention.
Figure 7A:
FIG. 7 is an explanatory diagram showing the transition of contents and playback positions.
Figure 7B:
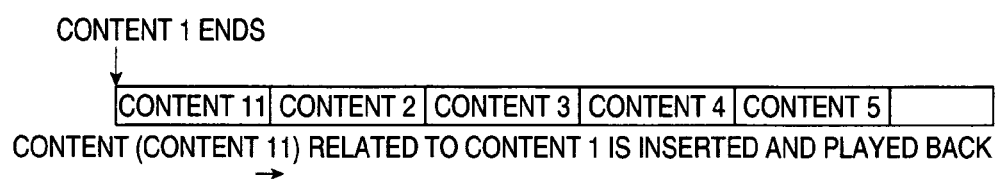
Figure 7C:
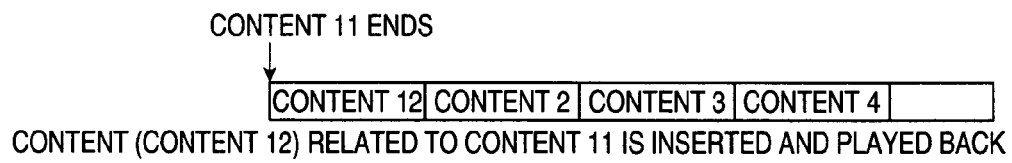
Figure 7D:
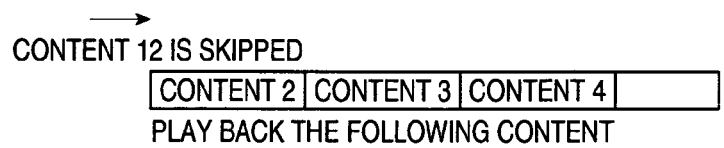

FIG. 4 is a flowchart for the operation of the content management mechanism 2 according to a second embodiment of the invention. The content management mechanism 2 acquires information on playback time for multiple contents from the file system 5 or the VOD server 6, serializes the order of the playback of the contents (S11, e.g., refer to FIG. 2), and plays back the contents in that order (S12). The content management mechanism 2 determines whether some action has been made according to a control signal from the remote controller 7 (S13). If some action has been made, the content management mechanism 2 determines whether it is an ending operation (S14), wherein when it is determined that it is not an ending operation, the content management mechanism 2 determines whether the action is "numeral and playback" entry by ten-key and playback-key operation (S15). When it is "numeral and playback" entry, the content management mechanism 2 shifts the playback position to the time designated by the numeral (S16), and updates the scheduled playback time to the top of the content (S17). In short, the scheduled playback time is updated with reference to the top position of the content that is being played back at the present.

When a negative determination is made in the determination process (S15), the content management mechanism 2 determines whether "playback" has been entered by playback-key operation (S18), wherein when "playback" has been entered, the content management mechanism 2 displays the present playback time on the display screen for a period of time (S19). For example, when the time that the "playback" is entered is "20", numeral "20" is displayed on the display screen. On the other hand, when it is determined in the determination process (S18) that "playback" has not been entered, the content management mechanism 2 makes an operation corresponding to the other key (e.g., a trick-play key or a volume-control key) (S20). After the processes (S19 and S20), the content management mechanism 2 determines whether the playback of the content has ended (S21), wherein when it has ended, the content management mechanism 2 shifts to the next content (content 2 in this example) to update the scheduled playback time (in this example, to set the starting time for content 2 to "0"), to shift to the content playback process (S12). In this way, the top position of the content during playback is always set to "0".

FIG. 5 shows the transition of contents and playback positions. For example, in the state in which content 1 is being played back, as shown in FIG. 5A, when a user wants to see the part of content 3 scheduled to be played back at the time indicated by numeral "120", which is twenty minutes later than the top, the playback position can be shifted to the position twenty minutes after the top of the scheduled content 3 by entering numerals "1", "4", and "0", and "playback" because 120+20=140 (S16). The scheduled playback time for the content 3 is changed to the top of the content 3 (S17). In this example, the time of the top of the content 3 is "0", and its scheduled playback time is "20". In this way, a desired content can be played back through designation of the offset from content starting time by entering a value that is the sum of a numeral specifying a content (e.g., "120") and a desired numeral, thus allowing intuitive and easy access to the beginning of a content.

To play back the previously displayed part (displayed by the process in S19) when power is turned off and then turned on, the playback position is shifted to the desired position by entering, for example, numerals "2" and "0" and "playback" (S15 to S17), thus allowing playback from that part.

In the second embodiment, the present playback position is displayed on the screen for a period of time through the operation of, e.g., the playback key during playback (this also applies to a playback pause time), as described above. A user can operate contents by numeric ten-key entry without via a menu, to playback them from a desired position by storing the present playback position by desired means. Of course, it is possible to use other means for notifying the user of the present playback position, such as an LCD monitor of the image display device 3 of the TV set 1 or a dedicated key. The content playback time can thus be designated directly, reducing the time and labor for finding the beginning of the content after playback operation, as in the related-art systems, to allow smooth playback operation for any contents.

Contents are not always produced in a multiple of the minimum unit time in actuality. Therefore, continuous content playback scheduling may cause a deviation smaller than the minimum unit time between scheduled content playback time and actual scheduled time. Accordingly, when the top of a content is present within the minimum unit time designated numerically, e.g., within one minute, it is desirable to play back the content back to the top thereof. This allows playback without leaving contents that are not aligned in the unit of the management time.

Third Embodiment

In a third embodiment, initially scheduled contents are reorganized dynamically depending on their audiovisual conditions. Here an example of automatic reorganization by searching for a content related to a played content will be described.

FIG. 6 is a flowchart for the operation of the content management mechanism 2 according to the third embodiment of the invention. The content management mechanism 2 acquires multiple contents from the file system 5 or the VOD server 6, serializes them, and calculates a playback time schedule (S31). The content management mechanism 2 then plays back the contents in that order (S32). The content management mechanism 2 determines whether some action has been made according to a control signal from the remote controller 7 (S33). If no action has been made, the content management mechanism 2 determines whether the playback of the contents has ended (S34), wherein when it determines that it has not ended, the playback is continued. When the playback of the content has ended, the content management mechanism 2 searches for a content related to the present content from the file system 5 or the VOD server 6 and acquires it (S35), serializes them again, and updates the scheduled playback time (S36). As a method for searching for the content related to the present content, any means may be used such as the similarity of URIs or titles, metadata recorded in association with images, or the similarity of images themselves.

When it is determined in the determination process (S33) that an action has been made, the content management mechanism 2 determines whether the action is an ending operation (S37), wherein when it is determined not to be an ending operation, the content management mechanism 2 determines whether the action is "a skip operation" by skip key entry (S38). When it is a "skip operation", the content management mechanism 2 shifts the content to the next designated content (S39), and updates the scheduled playback time to the top of the content (S40). On the other hand, when the action is not the "skip operation", the content management mechanism 2 makes an operation corresponding to the other key (e.g., a trick-play key or a volume-control key) (S41). After the processes (S36, S39, and S40), the content management mechanism 2 returns to the content playback process (S32). In the foregoing process, a fast-forward key may be used in place of the skip key.

FIG. 7 shows the transition of contents and playback positions. For example, when the playback of content 1 ends in the state shown in FIG. 7A (S34), "content 11" is searched for as a content related to the content 1 (S35). The contents are serialized again, and the scheduled playback time is updated (S36) into the state shown in FIG. 7B, where content 11 is played back (S32). When the playback of content 11 ends (S34), "content 12" is searched for as a content related to the content 11 (S35). The contents are serialized again, and the scheduled playback time is updated (S36) into the state shown in FIG. 7C, where content 12 is played back (S32). On the other hand, when it is determined that the action is a "skip operation" (S38), the content 12 is skipped to shift to the next "content 2" (S39), where the "content 2" is played back as shown in FIG. 7D (S32).

In the third embodiment, a content related to a played content is captured and played back, allowing dynamic reorganization of a content playback schedule using information that accompanies the content. This allows contents to be always viewed in the optimum order, allowing the optimum content to be played back in sequence without drawing up a schedule in advance.

Fourth Embodiment

The content management mechanism 2 may automatically delete a played content from the time base and automatically map new contents to effectively manage the contents in the limited time base. Alternatively, the content management mechanism 2 may delete the played content from the time base during the playback of a content with explicit delete means such as a delete key of the remote controller 7, or otherwise, the content may be left. In that case, the playback time is not initialized, so that the numeral indicative of the playback position is processed as the time from the top of the left content. After the deletion, a new content within the time base is added; if there is no content to be added, a new content may not be added. Here, an example of automatically deleting a played content and adding a new content will be described as a fourth embodiment.

Figure 8:
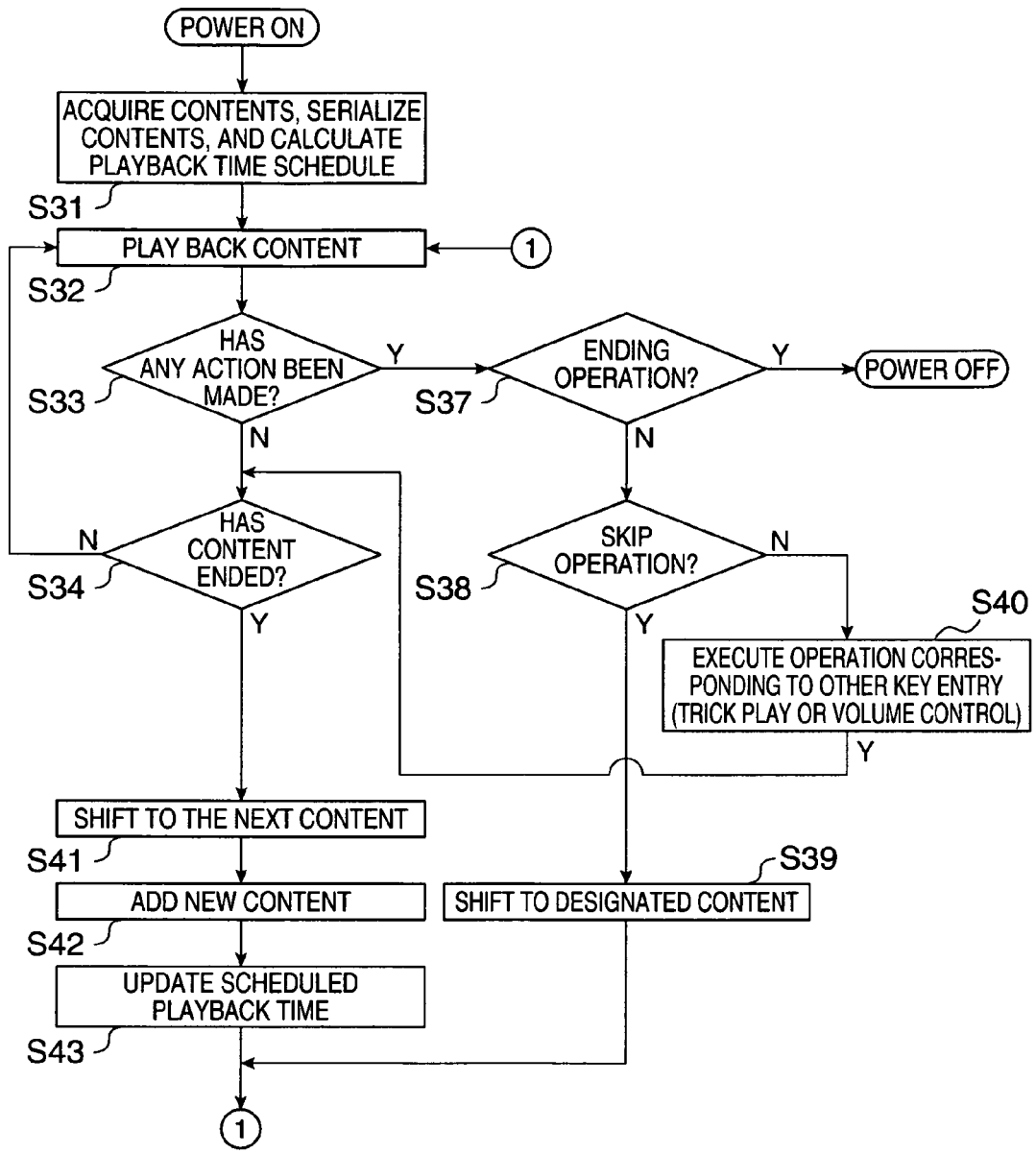
FIG. 8 is a flowchart for an operation according to a fourth embodiment of the invention.

FIG. 8 is a flowchart for the operation of the content management mechanism 2 according to the fourth embodiment of the invention. Here the difference from the process of FIG. 6 will be principally described. The content management mechanism 2 determines whether some action has been made according to a control signal from the remote controller 7 (S33). If no action has been made, the content management mechanism 2 determines whether the playback of the content has ended (S34), wherein when the playback of the content has ended, the content management mechanism 2 shifts the playback position to the following content (S41); deletes the played content and adds a new content (S42); and updates the scheduled playback time (S43). On the other hand, when a skip operation is made, the content management mechanism 2 shifts the playback position to the following content (S38 and S39). In this case, the scheduled playback time is not updated.

FIG. 9 shows the transition of contents and playback positions. For example, when the playback of content 1 ends in the state shown in FIG. 9A, the playback position shifts to content 2 (S41); content 7 is added (S42); and the scheduled playback time is recalculated with the top of the content 2 as the reference (S43), as shown in FIG. 9B. When a skip operation is made during the playback of the content 2, as shown in FIG. 9C, the playback position shifts to the designated content 3 (S39), as shown in FIG. 9D. At that time, the scheduled playback time is not updated, so that the present playback position remains at a value calculated from the top of the content 2.

In the fourth embodiment, since the played content is deleted from the management and a new content is added, as described above, contents can be managed effectively in a limited time base.

Fifth Embodiment

Figure 10:
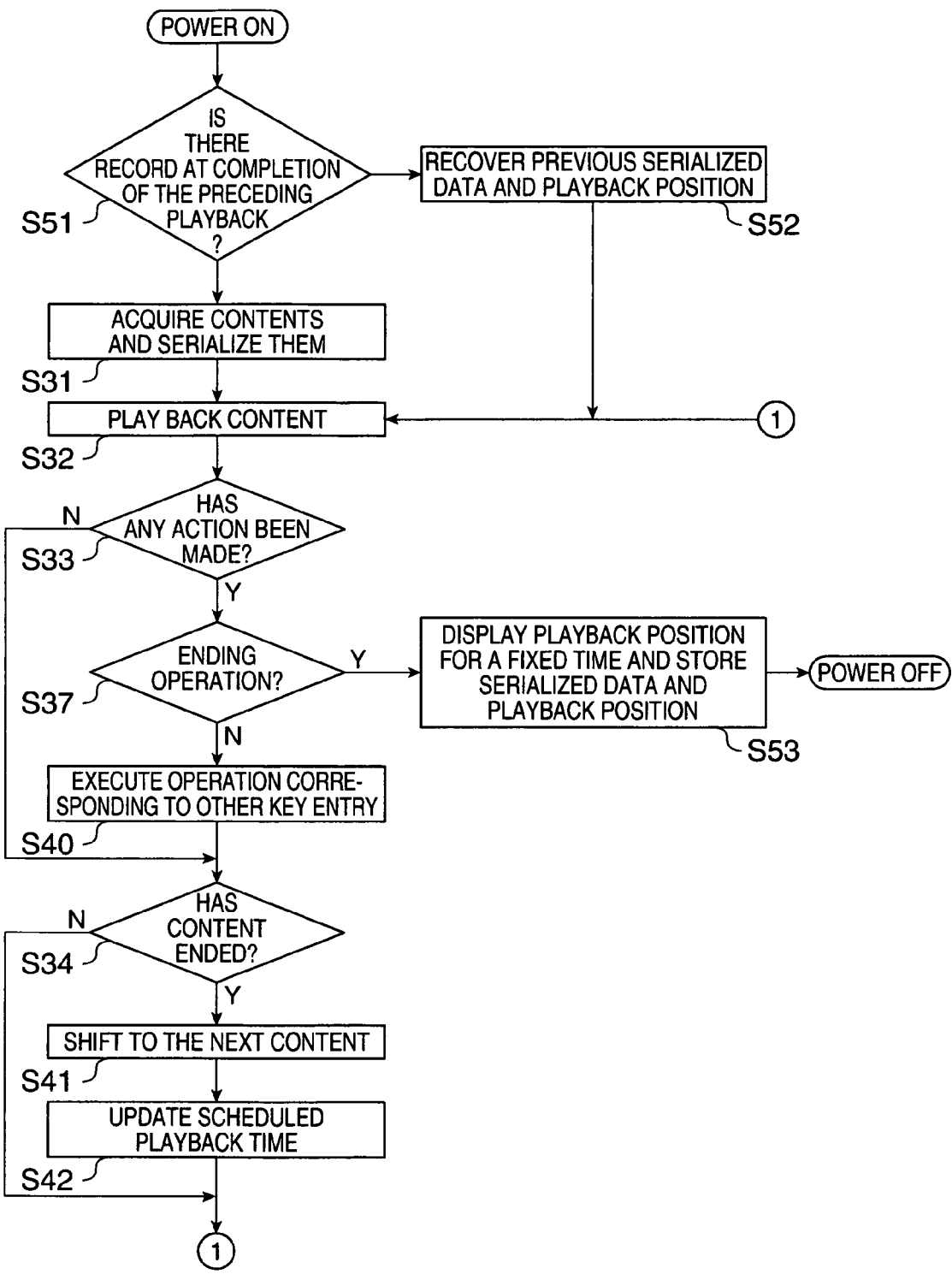
FIG. 10 is a flowchart for an operation according to a fifth embodiment of the invention.

FIG. 10 is a flowchart for the operation of the content management mechanism 2 according to a fifth embodiment of the invention. Here the difference from the process of FIG. 8 will be principally described. The content management mechanism 2 determines whether some action has been made according to a control signal from the remote controller 7 (S33). If an action has been made, the content management mechanism 2 determines whether the action is an ending operation (S37), wherein when it an ending operation, the content management mechanism 2 displays the playback position for a period of time, stores serial data and the playback position at that time in the nonvolatile memory 4, and turn off the power to terminate the procedure (S53). When the power is turned on again, the content management mechanism 2 determines whether there is a record of the completion of the previous playback in the nonvolatile memory 4 (S51), wherein when there is the record, the content management mechanism 2 recovers the preceding serialized data and playback position (S52), and plays back the content from the position (S32).

Figure 11A:
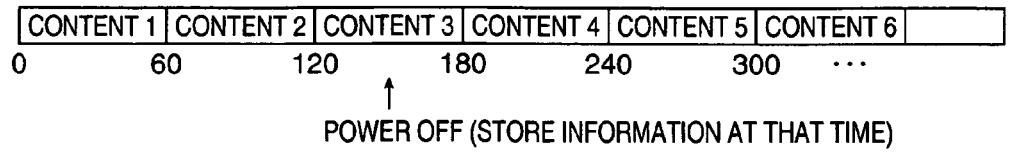
FIG. 11 is an explanatory diagram showing the transition of contents and playback positions.
Figure 11B:
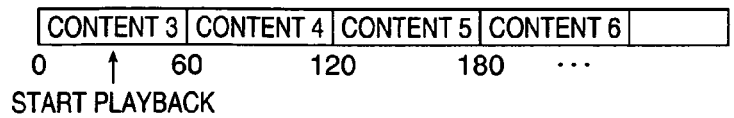

FIG. 11 shows the transition of contents and playback positions. When the process is terminated during the playback of the content 3, as shown in FIG. 11A, playback is started from that position on the basis of the serialized data and the playback position at that time, as shown in FIG. 11B, to allow the user to continuously view the content from the same position as that at power-off.

In the fifth embodiment, information at power-off is stored, and playback is started at the next power-on according to the information. Accordingly, the relevant content can be played back uninterruptedly.

Sixth Embodiment

While the foregoing embodiments assume that the content is video containing images (moving images) and audio, the content may contain only voice (e.g., music) or only images (e.g., still images). Furthermore, the content may be a combination of music and the moving images portion of video or still images. Its example will be described as a sixth embodiment.

Figure 12:
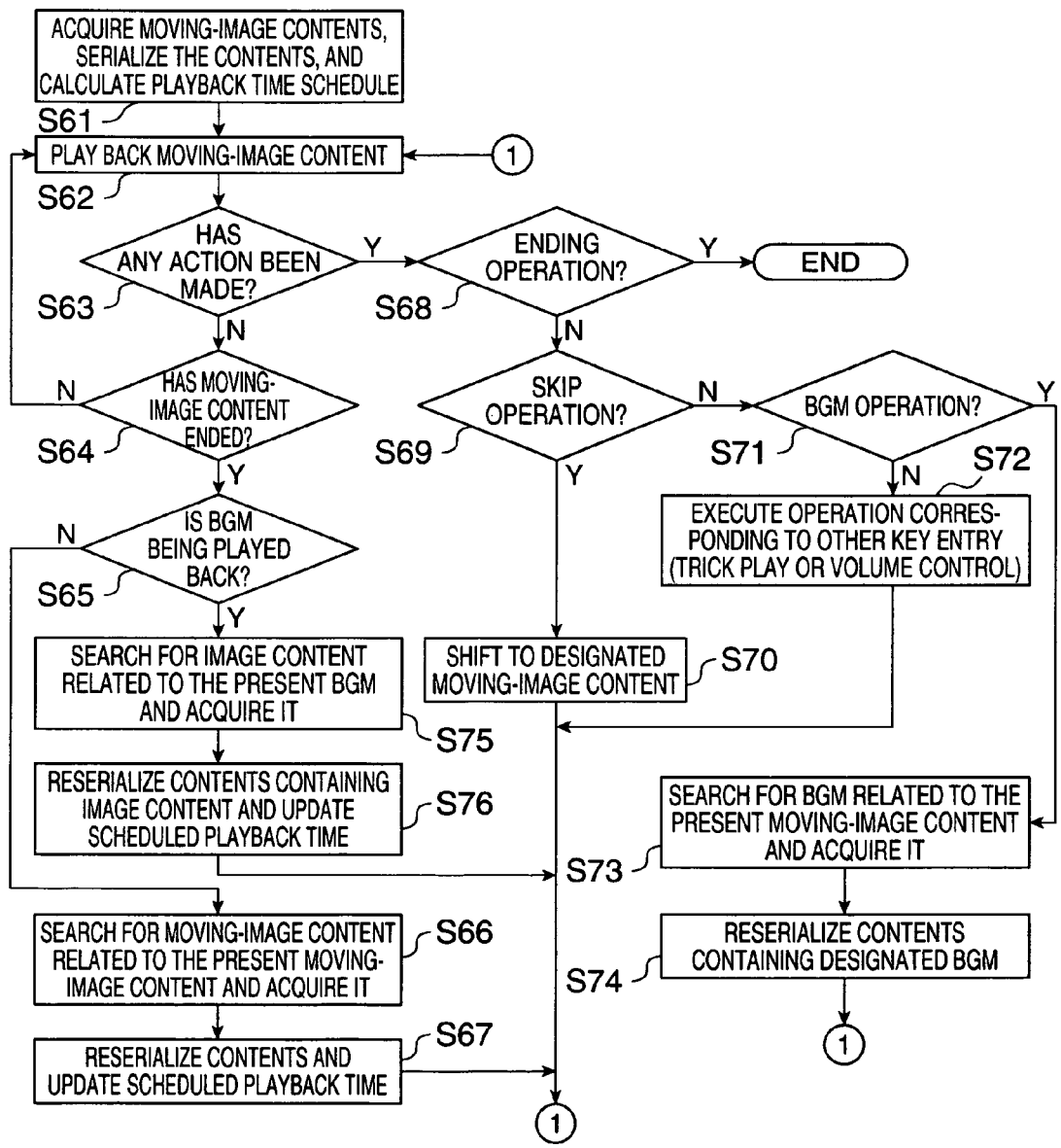
FIG. 12 is a flowchart for an operation according to a sixth embodiment of the invention.
Figure 13A:
FIG. 13 is an explanatory diagram showing the transition of contents and playback positions.
Figure 13B:
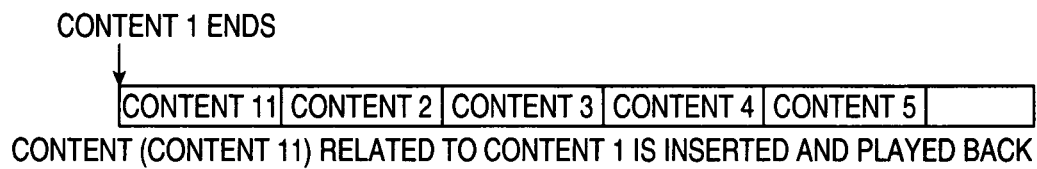
Figure 13C:
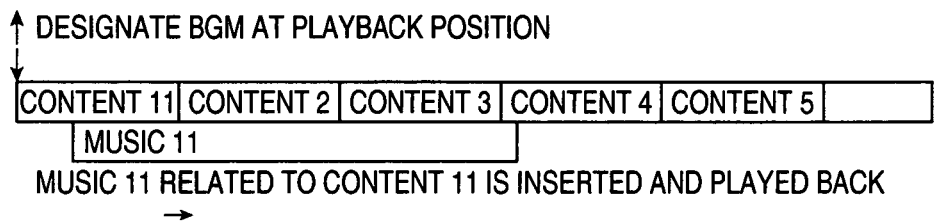
Figure 13D:
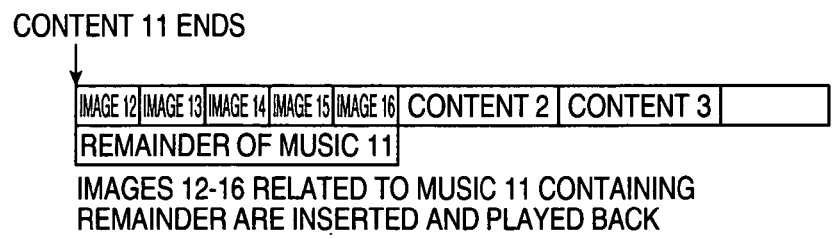

FIG. 12 is a flowchart for the operation of the content management mechanism 2 according to the sixth embodiment of the invention. The content management mechanism 2 acquires information on playback time for multiple moving-image contents from the file system 5 or the VOD server 6, temporarily determines (serializes) the order of the playback of the moving-image contents and calculates a playback time schedule (S61), and plays back the moving-image contents in the order of playback (S62). The content management mechanism 2 then determines whether some action has been made according to a control signal from the remote controller 7 (S63). If no action has been made, the content management mechanism 2 determines whether the moving-image content has ended (S64), wherein when the moving-image content has not ended, the content management mechanism 2 continues the playback; when it has ended, the content management mechanism 2 determines whether back ground music (BGM) is being played back (S65), wherein when the BGM is not being played back, the content management mechanism 2 searches for a moving-image content related to the present moving-image content from the file system 5 or the VOD server 6 and acquires the content (S66), reserializes them and updates the scheduled playback time (S67), and shift to a moving-image playback operation (S62).

In contrast, if some action has been made, the content management mechanism 2 determines whether the action is an ending operation (S68), wherein when it is an ending operation, the content management mechanism 2 terminates the procedure; when it is not an ending operation, the content management mechanism 2 determines whether the action is a skip operation (S69). If it is a skip operation, the content management mechanism 2 shifts the playback position to the designated position for the following moving-image content (S70). In contrast, when it is determined that the action is not a skip operation, the content management mechanism 2 then determines whether the action is a BGM operation (S71). When it is not a BGM operation, the content management mechanism 2 makes an operation corresponding to the other key (e.g., a trick-play key or a volume-control key) (S72). If it is determined that the action is "a BGM operation" by BGM key entry, the content management mechanism 2 searches for BGM related to the present moving-image content from the file system 5 or the VOD server 6 (S73), reserializes them containing the found BGM (S74), and shifts to a moving-image playback operation (S62).

On the other hand, when the BGM is being played back at the completion of the playback of the moving-image content, the content management mechanism 2 searches for an image content related to the present BGM from the file system 5 or the VOD server 6 (S75), reserializes them containing the image content, updates the scheduled playback time (S76), and shifts to a moving-image playback operation (S62).

FIG. 13 shows the transition of contents and playback positions. As shown in FIGS. 13A and 13B, when content 1 is played back and the playback ends, a content (content 11) related to the content 1 is inserted and played back (S66 and S67). As shown in FIG. 13C, when a BGM operation is made during the playback of the content 11, music 11 related to the content 11 is inserted and played back. As shown in FIG. 13D, when the BGM is still being played back at the completion of the playback of the content 11, images 12 to 16 related to the music 11 is searched for and inserted to be played back (S73, S74, and S62). When a user wants to change only music in content 11 containing moving images and music, such as an environmental video, the user can replace music without changing moving images by entering a separate BGM key of the remote controller 7. When there is the music playback time left at the completion of the playback of moving images in the content 11, the images 12 to 16 related to the music 11 are inserted at the point in time, and are played back while being switched at fixed intervals. When an image file is sent from the VOD server 6, information on the image file (what kind of picture it is) is also sent along with it. Accordingly, the content management mechanism 2 stores the image file as an image file, and stored the information, e.g., in the form of a list, allowing searching the list for an image file related to BGM.

In the sixth embodiment, a moving-image content and music can be played back in an appropriate combination. If the playback of music has not yet ended at the completion of the playback of the moving-image content, the music and an image related thereto can be played back in appropriate combination by searching for the image related to the music from the file system 5 or the VOD server 6 and playing back it.

The reorganization of contents according to the first to sixth embodiments is totally managed by the content management mechanism 2 of the TV set 1. Therefore, there is no need at all for the file system 5 or the VOD server 6 to have the system of scheduling, preparing a scenario, and providing a content by time designation. The existing system of the file system 5 or the VOD server 6 can be applied to the invention without change.

Seventh Embodiment

The first to sixth embodiments have been described for examples in which the content playback unit is applied to a TV set. The content playback unit can also be applied to electronic devices such as projectors, computers, and personal digital assistants (PDAs).

Image display devices for the electronic devices include CRTs and projection units.

A simple playback schedule can be provided by printing a list of numerals (scheduled playback time) assigned in the first to sixth embodiments and content titles or content screen images by a separate printer. The contents can be organized in such a manner that, after the numerals on the playback schedule are marked or filled with black, the numerals are scanned to allow OCR recognition, and specific contents are deleted.

The entire disclosure of Japanese Patent Application No. 2005-83448, filed Mar. 23, 2003 is expressly incorporated by reference herein.

What is claimed is:

1. A content playback unit comprising:
   a content management mechanism that plays back a plurality of contents in a predetermined order to display images of the contents on an image display device; wherein
   the content management mechanism manages the contents by:
      adding numerical information indicative of scheduled playback time to the contents so that the playback time of each of the contents is a time measured from a beginning of present content that is presently being played back, and
      updating, when the playback of the present content has completed and the next content that has not been previously played begins being played back, the numerical information of each of the contents so that the playback time of each of the contents is a time measured from the beginning of the next content, wherein a start time of each of the playback times of each of the contents does change such that the numerical information indicative of the start time of the playback of the next content is reset from a number greater than zero that indicates a time at an end or after the end of the playback time of the present content to zero.

2. The content playback unit according to claim 1, further comprising a controller for inputting various control signals, wherein
   when numerical information for managing contents and a control signal for a specified control key are input from the controller, the content management mechanism plays back the content from a portion indicated by the numerical information.

3. The content playback unit according to claim 2, wherein when a control signal for skipping or fast-forwarding is input, the content management mechanism starts playback from the relevant content or a designated position of the content.

4. The content playback unit according to claim 1, wherein when a control signal for a specified control key is input while a content is displayed on the image display device, the content management mechanism displays the playback time of the content on the image display device.

5. The content playback unit according to claim 1, wherein when the playback of the content ends, the content management mechanism deletes the completed content from the management, and adds a new content.

6. The content playback unit according to claim 1, wherein the content management mechanism stores information on multiple contents that are scheduled to be played back before power-off and playback position in a nonvolatile memory at power-off, and starts playback on the basis of the information at the next power-on.

7. A content playback unit according to claim 1, wherein when the playback of the present content is completed, the content management mechanism searches for content related to the present content from a file system or an external server, and manages the contents by updating the numerical information of each content following the beginning of the searched content.

8. A content playback unit according to claim 1, wherein when a control signal for a specified control key is input during the playback of a moving-image content, the content management mechanism searches for music related to the moving-image content from a file system or an external server, and manages the contents by updating the numerical information of each content following the beginning of the searched music.

9. The content playback unit according to claim 8, wherein when the playback of the music has not yet ended even when the playback of the moving-image content ends, the content management mechanism searches for an image related to the music from the file system or the external server, and plays back the image during the playback of the music.

10. An electronic device comprising the content playback unit according to claim 1.

11. The electronic device according to claim 10, further comprising an image display device that displays an image played back by the content playback unit.

12. A method for playing back a plurality of contents in a predetermined order in order to display images of the contents on an image display device, the method comprising:
adding numerical information indicative of scheduled playback time to the contents so that the playback time of each of the contents is a time measured from a beginning of present content that is presently being played back; and
updating, when the playback of the present content has completed and the next content that has not been previously played begins being played back, the numerical information of each of the contents so that the playback time of each of the contents is a time measured from the beginning of the next content, wherein a start time of each of the playback times of each of the contents does change such that the numerical information indicative of the start time of the playback of the next content is reset from a number greater than zero that indicates a time at an end or after the end of the playback time of the present content to zero.

* * * * *